US012584042B2

(12) United States Patent
Dirks et al.

(10) Patent No.: US 12,584,042 B2
(45) Date of Patent: Mar. 24, 2026

(54) METHOD FOR PRODUCING AN ADHESIVE CONNECTION

(71) Applicant: HELLA GmbH & Co. KGaA, Lippstadt (DE)

(72) Inventors: Heinz-Michael Dirks, Lippstadt (DE); Odo Karger, Geseke (DE); Sven Kinkel, Borchen (DE); Christian Wieck, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 135 days.

(21) Appl. No.: 18/211,905

(22) Filed: Jun. 20, 2023

(65) Prior Publication Data

US 2023/0332021 A1 Oct. 19, 2023

Related U.S. Application Data

(63) Continuation of application No. PCT/EP2021/085442, filed on Dec. 13, 2021.

(30) Foreign Application Priority Data

Dec. 21, 2020 (DE) ..................... 10 2020 134 413.9

(51) Int. Cl.
*C09J 7/35* (2018.01)
(52) U.S. Cl.
CPC ........... *C09J 7/35* (2018.01); *C09J 2301/304* (2020.08); *C09J 2301/416* (2020.08)
(58) Field of Classification Search
CPC ............ C09J 2203/354; C09J 2301/304; C09J 2301/416; C09J 5/06; C09J 7/35
See application file for complete search history.

(56) References Cited

U.S. PATENT DOCUMENTS

| | | | |
|---|---|---|---|
| 8,741,081 B2 | 6/2014 | Schmitt et al. | |
| 8,998,853 B2 | 4/2015 | Hoppe et al. | |
| 2023/0332021 A1* | 10/2023 | Dirks ......................... | C09J 5/06 |

FOREIGN PATENT DOCUMENTS

| | | | | |
|---|---|---|---|---|
| CA | 2994437 A1 * | 9/2018 | ............... | B27D 1/04 |
| DE | 9218604 U1 | 11/1994 | | |
| DE | 10348228 A1 | 7/2004 | | |
| DE | 102009042467 A1 | 3/2011 | | |
| DE | 102010045095 A1 | 3/2012 | | |
| DE | 102015202415 A1 | 8/2016 | | |

(Continued)

OTHER PUBLICATIONS

Translation of CA 2994437.*

(Continued)

*Primary Examiner* — Sonya M Sengupta
(74) *Attorney, Agent, or Firm* — Muncy, Geissler, Olds & Lowe, P.C.

(57) ABSTRACT

A method for producing an adhesive connection between a first component and a second component, wherein the first component has at least one cavity and the second component has at least one pin, The cavity is at least partially filled with an adhesive, and the components are aligned relative to one another such that at least sections of the pin project into the adhesive inside the cavity. A heating that is limited to the adhesive is carried out by means of a targeted, local introduction of heat into the adhesive in order to cure the adhesive.

12 Claims, 1 Drawing Sheet

(56) References Cited

FOREIGN PATENT DOCUMENTS

| | | | |
|---|---|---|---|
| DE | 102018008223 A1 | 9/2019 | |
| EP | 1975216 A1 * | 10/2008 | ............... C09J 5/06 |
| WO | WO 2020099156 A1 | 5/2020 | |

OTHER PUBLICATIONS

Translation of EP 1975216.*

Written Opinion of PCT/EP2021/085442.*

International Search Report dated Apr. 21, 2022 in corresponding application PCT/EP2021/085442.

Forytta, Markus; "Bonding without Adhesive" Fraunhofer IWS, Feb. 20, 2018 pp. 1-3.

Fraunhofer IWS et al; "HeatPressCool integrative (HPCI)"; Jan. 24, 2019, pp. 1-2.

Bauernhuber Andor et al; "Investigating thermal interactions in the case of laser assisted joining of PMMA plastic and steel"; Physics procedia, Elsevier, Amsterdam, NL; Sep. 9, 2014; pp. 811-817.

Office Action for Chinese Patent Application No. 202180084059.1 mailed on May 23, 2025.

Office Action for Chinese Patent Application No. 202180084059.1 mailed on Jan. 28, 2026.

* cited by examiner

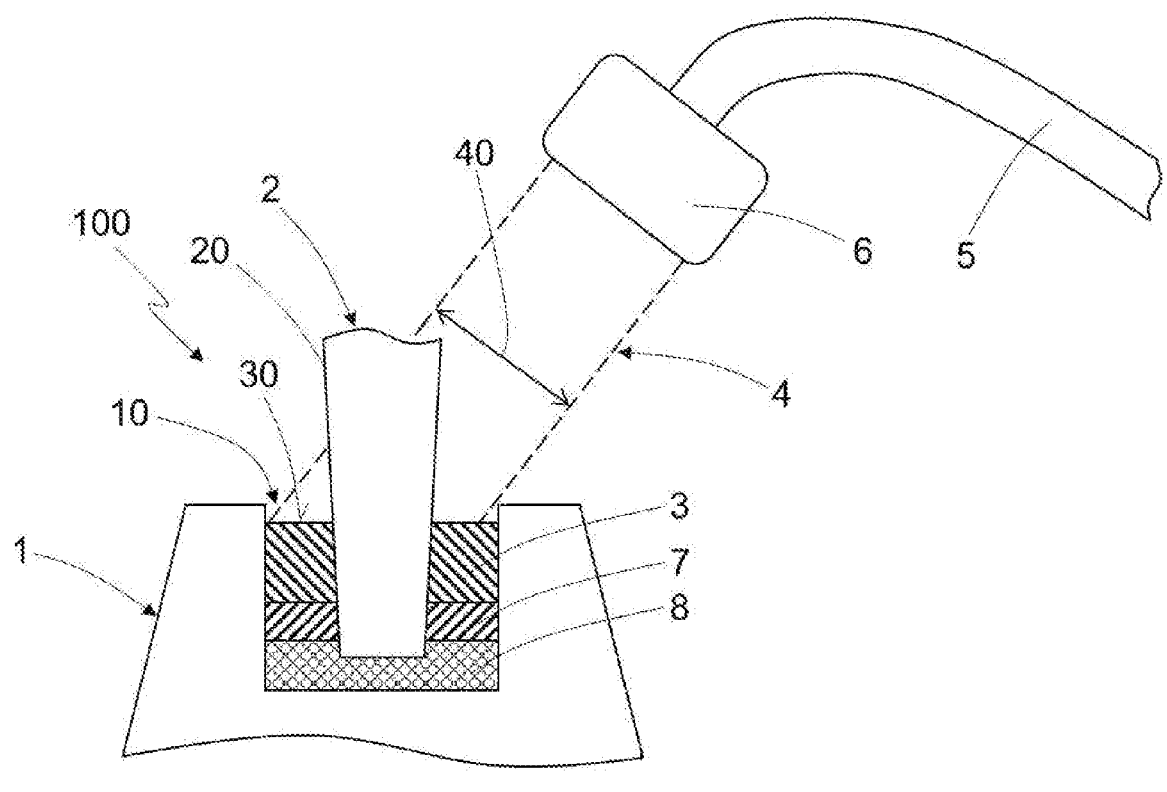

METHOD FOR PRODUCING AN ADHESIVE CONNECTION

This nonprovisional application is a continuation of International Application No. PCT/EP2021/085442, which was filed on Dec. 13, 2021, and which claims priority to German Patent Application No. 10 2020 134 413.9, which was filed in Germany on Dec. 21, 2020, and which are both herein incorporated by reference.

BACKGROUND OF THE INVENTION

Field of the Invention

The present invention relates to a method for producing an adhesive connection between a first component and a second component, wherein the first component has at least one cavity and the second component has at least one pin, wherein the cavity is at least partially filled with an adhesive and the components are aligned relative to one another such that at least sections of the pin project into the adhesive inside the cavity.

Description of the Background Art

For modern motor vehicle lighting devices, in particular for headlights, high demands are placed on precise positioning and orienting of lighting components such as lenses and reflectors relative to the associated light sources. It is necessary to take these high tolerance requirements into account during manufacturing, on the one hand, and furthermore the alignment of the lighting components must remain within the tolerance range in practical and long-term operation of the lighting device as well. The lighting components or associated holders are usually fixed to a support in their desired alignment by means of adhesive connections, wherein adhesive connections of such a nature are created that, in particular, a pin on the component side projects into an adhesive-filled cavity in the support as a connecting pin. This type of adhesive connection offers the possibility of fine adjustment in the alignment of the lighting components, typically while operating the light source and observing the resulting light effect on a projection surface.

A disadvantage with the use of adhesive connections is the volumetric shrinkage of adhesives during curing, which can result in a change in the adjusted alignment of the lighting components and a corresponding undesirable change in the light effect created by the lighting device. Numerous approaches for avoiding adverse effects associated with adhesive shrinkage are known in the prior art, for example using spacers and a preliminary fixing of the adhesive connection with a fast curing UV adhesive. To achieve a required final strength of the adhesive connection, a thermal cure adhesive, in particular a two-component adhesive, is subsequently applied in the remaining free space in the cavity. To cure this adhesive, the entire assembly is placed in an oven and subjected to an appropriate heat treatment. This procedure disadvantageously causes an undesirable loss of adjustment of the lighting components, since they are subject to thermal deformation during the heat treatment, which, to a certain extent, causes residual changes in shape of the components and changes in their relative arrangement, especially when the components that are bonded to one another are made of different materials, for example from thermoplastic and thermoset materials.

SUMMARY OF THE INVENTION

It is therefore an object of the present invention to provide a method for producing an adhesive connection, wherein the adhesive connection is formed between a first component with a cavity and a second component with a pin projecting into the cavity.

The invention includes the technical teaching that a heating that is limited to the adhesive is carried out by means of a targeted, local introduction of heat into the adhesive in order to cure the adhesive.

The invention is based on the concept of replacing the heat treatment by oven aging known from the prior art, which of necessity and disadvantageously causes a heating of the entire assembly, with a heating limited specifically to the adhesive volume to be cured, in which the components to be bonded are subjected to essentially no introduction of heat, and consequently are also subject to no undesirable thermal expansion. The amount of heat to be introduced for curing the adhesive is significantly smaller in this case than the energy requirements for an oven treatment of the entire assembly, so an advantage with respect to energy efficiency can also be achieved with the method according to the invention. As explained below in more detail, a local introduction of heat into the adhesive is undertaken according to the invention, in particular by means of targeted irradiation or a concentrated hot air flow.

Preferably, the introduction of heat into the adhesive takes place through an exposed adhesive surface, which is to say a surface that is not formed with one of the parts to be joined but instead is exposed to the ambient air and has sufficient accessibility for the introduction of heat, in particular through a ring-shaped gap extending around the pin. The introduction of heat takes place through the exposed adhesive surface and radiation absorption in the adhesive, wherein the introduced heat is also distributed in the adhesive volume through thermal conduction and convection. Alternatively, when electromagnetic radiation is used, heat can in principle also be applied to a covered, interior adhesive volume if the covering component has a high transmittance for the radiation employed and the adhesive has a sufficiently high absorptance for useful heating.

In an example of the method according to the invention, the introduction of heat can be carried out by means of irradiation of the adhesive with laser radiation. For the purpose of targeted, locally delimited introduction of heat, laser radiation is characterized by the useful combination of high intensity, sharp beam focusing, and a narrow frequency range.

Preferably, the adhesive can be irradiated with laser radiation from the infrared spectral range. For example, shortwave infrared radiation with a wavelength of 980 nm has proven useful for curing the two-component adhesives that are typically used. In particular, the adhesive should be irradiated with laser radiation from a spectral range in which the adhesive has a high spectral absorptance. This ensures efficient heating of the adhesive and prevents significant portions of the radiation from being transmitted through the adhesive and causing undesirable heating of the adjacent component sections.

Preferably, the laser radiation is conveyed to the adhesive by an optical waveguide with output optics for the purpose of irradiation. A configuration of this nature offers high flexibility with regard to orientation of the laser radiation relative to the components to be bonded so that even poorly accessible adhesive connections can be irradiated, which is to say, in particular, that the exposed adhesive surface can be irradiated directly by the laser radiation.

The laser radiation can also be guided over the exposed adhesive surface in a raster pattern, for example. The beam cross section in this case is smaller than the exposed adhesive surface, for example, and the adhesive is successively heated by moving the laser spot along the surface, wherein multiple passes of the laser spot may also be appropriate, for example.

For example, the adhesive can be irradiated with laser radiation with a beam diameter of 1 mm to 10 mm, in particular 5 mm, and/or the irradiation is carried during out an irradiation period of 10 s to 100 s, preferably 45 s to 75 s. These short process times represent another advantage of the method according to the invention over an oven treatment known from the prior art.

As an alternative to the use of laser radiation, the introduction of heat can be carried out by means of irradiation of the adhesive with radiant heat from a conventional infrared radiator or the polychromatic radiation from an incandescent lamp, in particular a halogen emitter. In particular, the introduction of heat in this case can be carried out by means of focused irradiation, which is to say that appropriate focusing optics are used, by which means the radiation is focused and guided in a targeted manner onto the exposed surface of the adhesive so that local radiation input with high intensity results.

The introduction of heat can be carried out by application of a directed hot air stream to the adhesive. In comparison with the locally sharply delimited laser radiation, in this alternative embodiment a heating of the component sections adjacent to the adhesive connection must typically be accepted.

For example, the adhesive is heated to a temperature of 150° C. to 250° C., preferably 170° C. to 190° C., in particular 180° C., for curing.

Preferably, the adhesive can be chosen as a two-component adhesive, typically formed of a resin and a hardener, or as a heat-curing single-component adhesive. After conclusion of the introduction of heat according to the invention, in the case of a conventional two-component adhesive, handling strength is typically present after about one minute and final strength is present as soon as after about three minutes.

In particular, the method according to the invention is advantageously employed to produce adhesive connections in which the first component is chosen as a support and the second component is chosen as a light source or an optical component of a motor vehicle lighting device.

Additional measures that improve the invention are discussed in detail below in conjunction with the description of a preferred exemplary embodiment of the invention on the basis of the FIGURE.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE illustrates an example of producing an adhesive connection according to an exemplary embodiment.

DETAILED DESCRIPTION

The FIGURE illustrates the method according to the invention for producing the adhesive connection 100 between the first component 1 with the cavity 10 and the second component 2 with the pin 20. For example, the first component 1 represents a support and the second component 2 represents a holder of a lighting component, such as a lens or a reflector, of a motor vehicle lighting device, wherein the components 1 and 2 are in a desired alignment relative to one another for lighting purposes, in which sections of the pin 20 project into the adhesive 3 inside the cavity 10, and which alignment is to be permanently fixed by means of the adhesive connection 100 produced in accordance with the invention.

In the present example, a preliminary and only conditionally load-bearing adhesive connection has already been created in preceding process steps by means of the resilient spacer element 8 and the UV-light cured adhesive 7. The adhesive 3 intended for final strength preferably is implemented as a two-component adhesive and has been applied in the mixed, curable state to the cavity 10, where it surrounds the pin 20 in a ring shape. According to the invention, a heating limited to the adhesive 3 is carried out by means of a targeted, local introduction of heat into the adhesive 3 for the purpose of curing, wherein the introduction of heat is accomplished here by way of example by means of irradiation with laser radiation 4 through the exposed adhesive surface 30. Through absorption of the laser radiation 4, which preferably is in the near infrared, the adhesive 3 absorbs the heat required for its curing, and in the process is heated to temperatures of typically 150-200° C. In the use case shown, an irradiation period of approximately one minute is sufficient here to create the requisite heating of the adhesive 3. The laser radiation preferably comes from a continuous wave laser and is directed to the exposed adhesive surface 30 by the optical waveguide 5 and the output optics 6, wherein the beam diameter 40 is, for example, 1-10 mm, preferably 5 mm. The laser radiation can be guided over the adhesive surface 30 in a raster pattern, for example, or, as shown here, the beam diameter is chosen such that it corresponds essentially to the diameter of the cavity 10, wherein a proportionate irradiation of the pin 20 then takes place.

The invention is not limited in its implementation to the preferred exemplary embodiment provided above. Instead, a number of variants are possible that make use of the described solution even in embodiments that are fundamentally different in nature. All features and/or advantages, including design details, spatial arrangements, and method steps, that derive from the claims, the description, or the drawings, can be essential for the invention individually as well as in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A method to produce an adhesive connection between a first component and a second component, wherein the first component has at least one cavity and the second component has at least one pin, the method comprising:

at least partially filling the cavity with an adhesive;

aligning the first and second components relative to one another such that at least sections of the pin project into the adhesive inside the cavity; and introducing heat to the adhesive, after the aligning of the first and second components, in order to cure the adhesive, the heat introduced to the adhesive being limited via a targeted, local introduction of the heat into the adhesive, wherein the introduction of the heat is carried out by irradiation of the adhesive with laser radiation, wherein the adhesive is irradiated with the laser radiation from the infrared spectral range, and wherein the introduction of the heat into the adhesive takes place through an exposed adhesive surface of the adhesive, the exposed adhesive surface being exposed to ambient air.

2. The method according to claim 1, wherein the adhesive is irradiated with the laser radiation from a spectral range in which the adhesive has a high spectral absorptance.

3. The method according to claim 1, wherein the laser radiation is conveyed to the adhesive by an optical waveguide with output optics for irradiation.

4. The method according to claim 1, wherein the laser radiation is guided over an exposed adhesive surface of the adhesive in a raster pattern.

5. The method according to claim 1, wherein the adhesive is irradiated with the laser radiation with a beam diameter of 1 mm to 10 mm.

6. The method according to claim 1, wherein the irradiation is carried during out an irradiation period of 10 s to 100 s.

7. A method to produce an adhesive connection between a first component and a second component, wherein the first component has at least one cavity and the second component has at least one pin, the method comprising:

at least partially filling the cavity with an adhesive;

aligning the first and second components relative to one another such that at least sections of the pin project into the adhesive inside the cavity; and introducing heat to the adhesive in order to cure the adhesive, the heat introduced to the adhesive being limited via a targeted, local introduction of the heat into the adhesive, wherein the introduction of the heat is carried out by irradiation of the adhesive with radiant heat from an infrared radiator or a polychromatic radiation from an incandescent lamp or a halogen emitter.

8. The method according to claim 7, wherein the introduction of the heat is carried out by focused irradiation of the adhesive.

9. A method to produce an adhesive connection between a first component and a second component, wherein the first component has at least one cavity and the second component has at least one pin, the method comprising:

at least partially filling the cavity with an adhesive;

aligning the first and second components relative to one another such that at least sections of the pin project into the adhesive inside the cavity; and introducing heat to the adhesive in order to cure the adhesive, the heat introduced to the adhesive being limited via a targeted, local introduction of the heat into the adhesive, wherein the introduction of the heat is carried out by application of a directed hot air stream to the adhesive.

10. The method according to claim 1, wherein the adhesive is heated to a temperature of 150° C. to 250° C.

11. The method according to claim 1, wherein the adhesive is a two-component adhesive or a heat-curing single-component adhesive.

12. The method according to claim 1, wherein the first component is a support and the second component is a light source or an optical component of a motor vehicle lighting device.

* * * * *